United States Patent [19]

Moon

[11] 4,179,274

[45] Dec. 18, 1979

[54] RESPIRATOR FILTER AND METHOD OF MAKING THE SAME

[76] Inventor: William F. Moon, 310 W. Front St., Buchanan, Mich. 49107

[21] Appl. No.: 647,113

[22] Filed: Jan. 7, 1976

[51] Int. Cl.² .......................................... B01D 39/14
[52] U.S. Cl. .............................. 55/524; 55/DIG. 5; 55/DIG. 35; 428/280; 428/156; 128/206.17; 156/254
[58] Field of Search ......... 55/524, 527, 528, DIG. 35, 55/DIG. 5; 210/492, 508, 509; 98/115 SB; 156/254; 128/142.6; 428/280, 85, 212, 156

[56] References Cited

U.S. PATENT DOCUMENTS

| | | | |
|---|---|---|---|
| 2,368,024 | 1/1945 | Himmell | 156/254 |
| 2,521,984 | 9/1950 | Lang | 55/528 |
| 2,772,195 | 11/1956 | Gaarder | 55/524 |
| 2,782,933 | 2/1957 | Monsarrat | 55/521 |
| 3,142,549 | 7/1964 | Klusewitz et al. | 55/486 |
| 3,624,161 | 11/1971 | Bub | 55/527 |
| 3,850,600 | 11/1974 | Monsted, Jr. | 55/524 |

*Primary Examiner*—Bernard Nozick
*Attorney, Agent, or Firm*—Oltsch, Knoblock & Hall

[57] ABSTRACT

A respirator filter is formed of felt impregnated with rosin, which is fractured throughout and is characterized by loosened fibers at one surface thereof. The method of forming the filter entails splitting a batt with fractured rosin impregnation to separate and displace the fibers at the plane of cleavage from their prior felted position.

4 Claims, 6 Drawing Figures

U.S. Patent Dec. 18, 1979 4,179,274
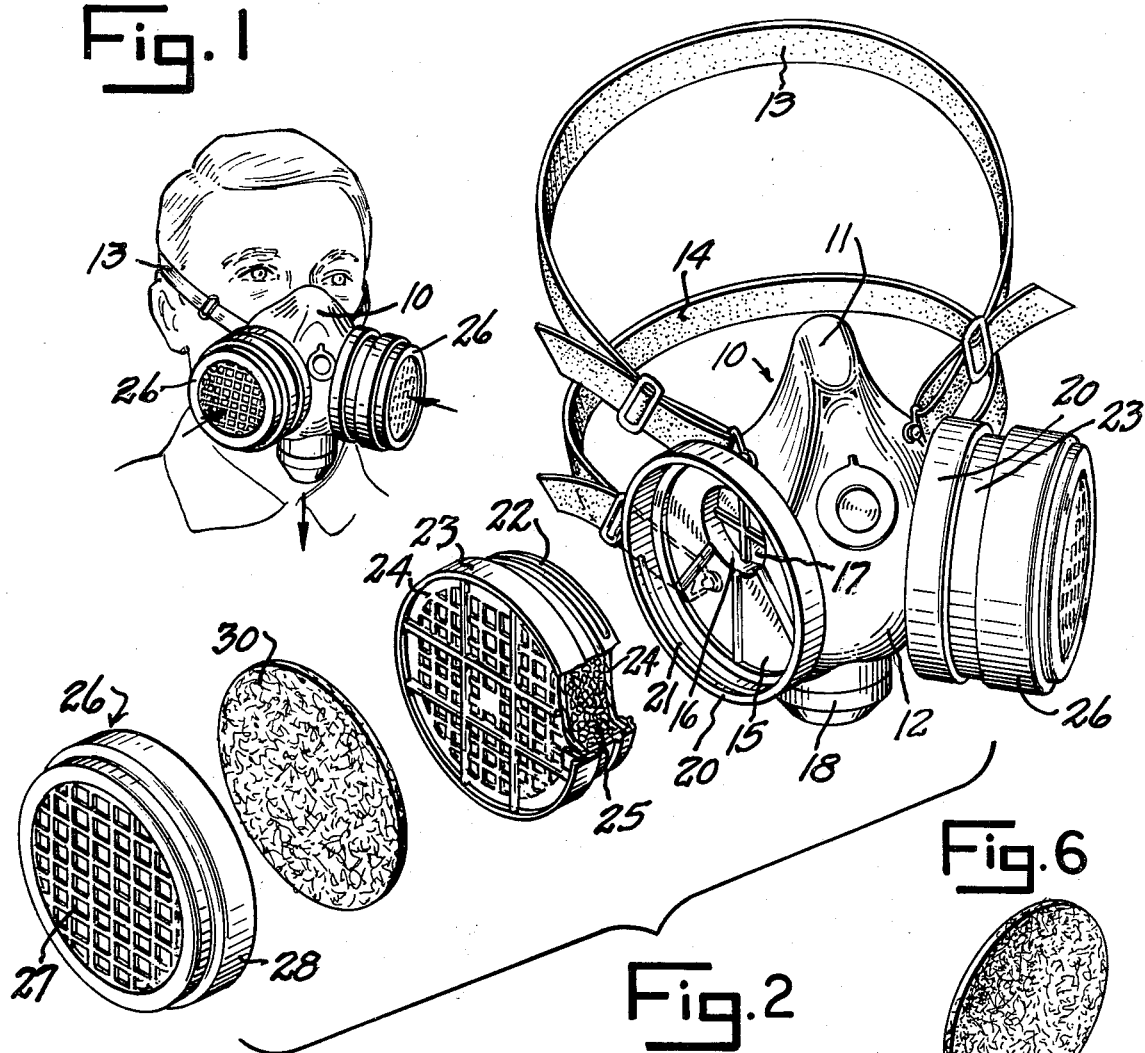
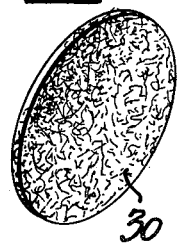
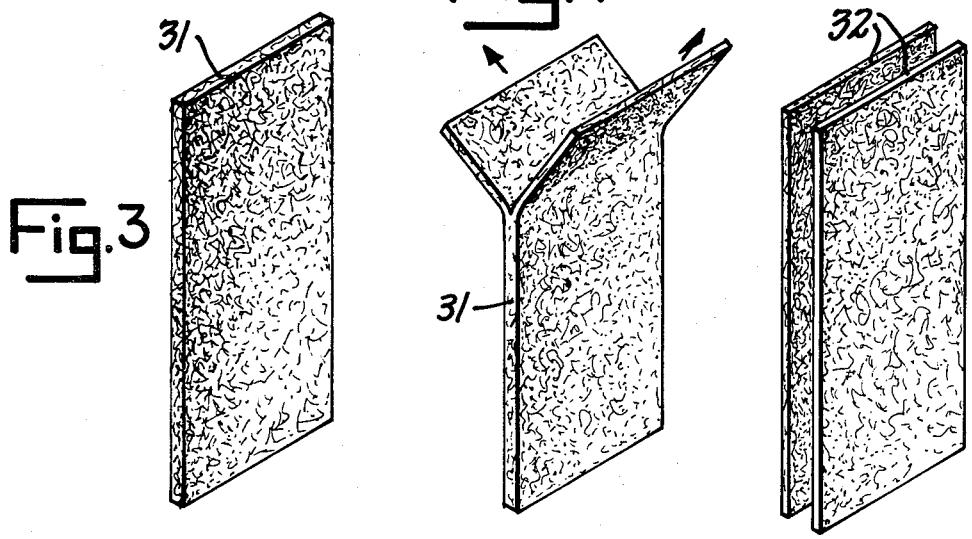

RESPIRATOR FILTER AND METHOD OF MAKING THE SAME

This invention relates to respirator filters and the method of making the same.

Respirators are worn by workers in areas which dusts, vapors, sprays or mists exist which are harmful when inhaled. Such respirators are equipped with filters and chemical cartridges at the air intakes of the face piece of the respirator. The face piece is provided with a check valve at each air intake to prevent exhalation therethrough, and with an outlet or discharge opening provided with a check valve which permits exhalation or discharge therethrough and prevents intake therethrough.

The filter material used in such respirators is commonly a felt of wool, or a blend of wool and cotton or synthetic fiber which has been impregnated with rosin which has been fractured or energized to develop a static electric charge. When respirators using such filters are used in areas containing mists or sprays of liquids such as paints or lacquers, a layer of particulate paint or lacquer material forms on the surface of the filter. As this surface layer forms it rapidly blocks the filter and soon prevents adequate air passage for breathing by the wearer. Consequently, frequent change of the filter is required at a cost which includes the price of the filter and the loss of time of the user required incident to work interruptions required to change the filter. Furthermore, most filters of this type do not meet the standards of the National Institute of Occupational Safety and Health (NIOSH) for use for spray painters.

Respirators for use by spray painters are now marketed which are characterized by a thicker felt than the felts of wool and blends mentioned above. The filters for such paint respirators may also be laminar with a laminate of wool felt or a felt formed of a blend of wool and a synthetic such as polypropylene, and a second laminate of low density glass fiber or synthetic fiber or a non-woven porous fabric. The laminates may be marginally adhered, as by heat sealing or an adhesive, or otherwise attached.

I have found that it is possible to provide an effective filter for use in misty atmospheres without requiring the use of a multi-laminar filter material.

It is the primary object of this invention to provide a filter for respirators which meets the standards required for use in misty or paint spray atmospheres and which is simple, inexpensive and easy to make and to install.

A further object is to provide a filter for a respirator having improved static electric properties.

A further object is to provide a felt type fractured rosin impregnated filter characterized by loosened surface fibers providing a lofty or fluffed surface texture.

A further object is to provide a novel method by which a filter from a felt batt impregnated with fractured rosin is processed rapidly and easily to enhance the properties thereof required for acceptable use in misty or paint spray atmospheres.

Other objects will be apparent from the following specification.

In the drawing:

FIG. 1 is a perspective view of a respirator employing my improved filter.

FIG. 2 is an exploded view illustrating the arrangement of the parts of the respirator at the air intake filter carrying portion thereof.

FIG. 3 is a perspective view of a batt of impregnated filter forming felt.

FIG. 4 is a perspective view illustrating the method of forming my improved filter from the batt shown in FIG. 3.

FIG. 5 is a perspective view illustrating two improved filter members formed from the batt shown in FIG. 4 by my method.

FIG. 6 is a perspective view of the improved filter cut to shape for use in the respirator illustrated in FIGS. 1 and 2.

DESCRIPTION OF THE PREFERRED EMBODIMENT

Referring to the drawing which illustrates the preferred embodiment of the invention as applied to a typical respirator, the numeral 10 designates a face piece or mask which is formed of rubber or synthetic flexible material and is worn as illustrated in FIG. 1. The face piece includes a portion 11 fitting over the nose and a portion 12 fitting under the chin of the wearer. An upper head strap 13 and a lower head strap 14 serve to hold the face piece 10 in operative position, said straps having their ends anchored adjustably to opposite sides of the face piece at spaced parts thereof. It will be understood that the face piece is drawn for continuous marginal contact with the contour of the face and that the central portion thereof defines a cavity into which air may be drawn during breathing of the user.

The face piece has secured thereto at each side thereof a rigid disk 15 surrounding an opening 16 in the face piece which is spanned by a flexible disk 17 positioned interiorly of the face piece and adapted to constitute a check valve permitting entry of air into the face piece, but preventing exhaust of air from the face piece. The respirator is provided with an exhaust outlet 18, preferably at the lower portion thereof which exhaust outlet has a check valve (not shown), such as a flexible disk similar to the disk 17 so mounted as to be closed during inhalation of the wearer and opened upon exhalation.

Each disk 15 has a cylindrical rim portion 20 which is provided with an internal thread 21 into which an externally screw threaded end portion 22 of a cartridge or carrier 23 is releasably anchored. The carrier 23 preferably has a cylindrical body spanned at its opposite ends by a grill or reticulated wall 24, and encloses therein a porous body 25 of activated charcoal or other material to absorb organic vapors. An end cap 26 having a reticulated end wall or grill 27 has releasable connection at cylindrical wall 28 thereof with the carrier 23 as accommodated by locking lugs or other suitable releasable interlocking means (not shown). My improved filter disk 30 is positioned within the cylindrical wall 28 of end cap 26 between the reticulated end wall 27 thereof and the outermost grill or reticulated wall 24 of the cartridge carrier 23. The disk 15, carrier 23 and end cap 26 are preferably formed of light-weight shape-retaining non-corrosive material such as synthetic resin or synthetic rubber or the like accommodating desired position and relation and assembly of the parts with both cartridge 25 and the filter disk 30 completely spanning the unit so that all air passing into the cavity of the face piece must pass through the cartridge and the filter disk. Filter disk 30 is formed of a felted mass of fibers such as wool, cotton, synthetic resin or combinations thereof. The felted mass is impregnated with a rosin, such as zinc rosinate. The zinc rosinate is fractured as by bending or flexing the mass, which fracturing action develops a static electrical charge therein and ensures substantially uniform porosity for penetration of air therethrough. At least one surface of the filter disk is characterized by loosened or fluffed fibers extending outwardly from the disk substantially uniformly throughout the surface to provide a lofted or fluffed surface texture. The filter disk 30 is installed to span the end cap 26 with its loosened or fluffed fibrous surface outermost, i.e. in contact with the reticulated end wall 27 of the cap.

Tests of respirators with my improved filter disk reveal that is effective to meet NIOSH standards for paint respirators, and that such filter disks possess substantially the same paint or mist filter properties heretofore achieved by the multi-laminar or other felt type filters heretofore required. The filter disk effectively bars entry into the face piece of particulate material or mist of paint, herbicides, pesticides and like liquids and liquid sprays and mists.

The method of forming the improved filter is illustrated in FIGS. 3, 4 and 5. FIG. 3 illustrates a batt 31 of felted material formed of fibers of wool, cotton, synthetic resin, or combinations thereof, which is of substantially uniform thickness, as in the order of 3/16". The batt is impregnated with a rosin, such as zinc rosinate, and is subjected to flexure or other action which will substantially uniformly fracture the rosin throughout the batt. The batt 31 is then delaminated, split or pulled apart from one end thereof to the other, as illustrated in FIG. 4, to form two substantially equal halves, that is, two pieces 32 of the same length and width as the batt 31 and each of approximately one-half the thickness of the batt 31. The splitting or pulling or tearing of the batt in this manner serves to break or sever fibers along the line of cleavage or separation and to pull or displace those fibers from their prior position in the felt batt, and provides a surface of each half or section at the plane or surface of cleavage which is different from the surface texture of the sides of the batt 31. This cleavage surface is characterized by loosened and projecting fibers throughout its full extent, said surface texture providing what I choose to call a lofted or fluffed felt surface. Disks 30 are cut from delaminated pieces 32.

One of the characteristics of the split felt halves or sections 32 with the lofted or fluffed surface is that the rosin impregnant is further fractured as a result of the forming action and thus further energizes the sections, i.e. enhances the static electrical properties thereof, such static electrical properties being highly desirable in respirator filters.

It will be understood that the method I have described can be practiced using felted batts impregnated with rosin such as zinc rosinate which has been fractured, and that filter disks of any selected thickness may be formed by the separating action. Also, it will be understood that a single batt may be divided into a number of similar parts or pieces of any selected thickness, so that when a batt is divided into three or more pieces the innermost pieces will be characterized by lofted surfaces at both faces thereof while the end pieces will have such a lofted surface at only one face thereof.

While the preferred embodiments of the invention have been illustrated and described, it will be understood that changes may be made in the construction and process within the scope of the appended claims without departing from the spirit of the invention.

What I claim is:

1. In a filter for use at the intake opening of a respirator comprising a felted body of fibers impregnated with a rosin which is uniformly fractured, the improvement wherein said body is characterized by a surface at which the ends of fibers are loose and fluffed and extend outwardly from the body to provide a fluffed or lofted substantially uniform surface texture, said body being of substantially uniform thickness throughout.

2. A filter as defined in claim 1, wherein said body constitutes a section of a batt of greater thickness than said body and is formed by pulling said body from said batt along a plane interiorly of said batt, said fluffed surface texture occurring at the plane of separation of said body from said batt.

3. The method of forming a filter for use in a respirator from a felted body of fibrous material which has been impregnated with a rosin and treated to uniformly fracture the rosin, consisting of the step of splitting from said body a piece thereof by pulling apart pieces of the body whereby end portions of the fibers of said pieces are loosened at the surfaces of said pieces and outwardly projected and displaced from and lofted relative to the plane of separation of said pieces.

4. The method defined in claim 3, wherein the split piece is of substantially uniform thickness.

* * * * *